(12) United States Patent
Hemsley

(10) Patent No.: US 8,661,786 B2
(45) Date of Patent: Mar. 4, 2014

(54) PASSIVE SECONDARY AIR DELIVERY SYSTEM FOR TWO BED CATALYST SYSTEM

(75) Inventor: Geoffrey V. Hemsley, Fort Collins, CA (US)

(73) Assignee: Woodward, Inc., Fort Collins, CO (US)

( * ) Notice: Subject to any disclaimer, the term of this patent is extended or adjusted under 35 U.S.C. 154(b) by 713 days.

(21) Appl. No.: 12/166,119

(22) Filed: Jul. 1, 2008

(65) Prior Publication Data

US 2010/0000204 A1 Jan. 7, 2010

(51) Int. Cl.
*F01N 3/30* (2006.01)

(52) U.S. Cl.
USPC .............................. 60/280; 60/307

(58) Field of Classification Search
USPC ........... 60/280, 289, 290, 293, 307, 308, 317, 60/319
See application file for complete search history.

(56) References Cited

U.S. PATENT DOCUMENTS

| | | | | |
|---|---|---|---|---|
| 3,662,540 A * | 5/1972 | Murphey | ........................ | 60/274 |
| 3,826,089 A * | 7/1974 | Nakajima et al. | ............... | 60/290 |
| 4,049,388 A * | 9/1977 | Scheitlin et al. | .............. | 422/171 |
| 4,098,079 A | 7/1978 | Ueda | | |
| 4,134,262 A * | 1/1979 | Sugihara et al. | ................ | 60/289 |
| 4,534,173 A * | 8/1985 | Tsukamoto | ..................... | 60/606 |
| 4,936,093 A * | 6/1990 | Goerlich | .......................... | 60/280 |
| 5,987,885 A | 11/1999 | Kizer et al. | | |
| 6,227,180 B1 | 5/2001 | Hoffmann et al. | | |
| 6,722,125 B1 | 4/2004 | Pfalzgraf | | |
| 7,162,861 B2 | 1/2007 | Khair | | |
| 7,448,204 B2 | 11/2008 | Nishimura et al. | | |
| 2006/0150617 A1* | 7/2006 | Nishimura et al. | ............. | 60/289 |
| 2007/0271918 A1* | 11/2007 | Nishiyama et al. | ............. | 60/600 |

FOREIGN PATENT DOCUMENTS

| | | |
|---|---|---|
| CN | 1920268 A | 2/2007 |
| JP | 6017646 A | 1/1994 |
| JP | 09-173782 A | 7/1997 |
| KR | 20-1997-0040465 A | 7/1997 |
| WO | WO 2005095767 A1 * | 10/2005 ................ F01N 3/08 |

* cited by examiner

*Primary Examiner* — Kenneth Bomberg
*Assistant Examiner* — Jonathan Matthias
(74) *Attorney, Agent, or Firm* — Reinhart Boerner Van Deuren P.C.

(57) ABSTRACT

A passive secondary air delivery system for a two bed catalyst is provided. The system delivers passive secondary air to the second catalyst bed to facilitate oxidation of CO and remaining unburned HC. In a turbocharged engine, the secondary air may be provided from the compressor side of the turbocharger. Control of the amount of air bled from the turbocharger is provided by an orifice in the pipe connecting the turbocharger to the catalyst bed. No active controls are required. In non-turbocharged engines, passive secondary air may be provided by a venturi mixer ported to ambient positioned between the two catalyst beds. In either embodiment, no moving parts or active controls are required.

16 Claims, 2 Drawing Sheets

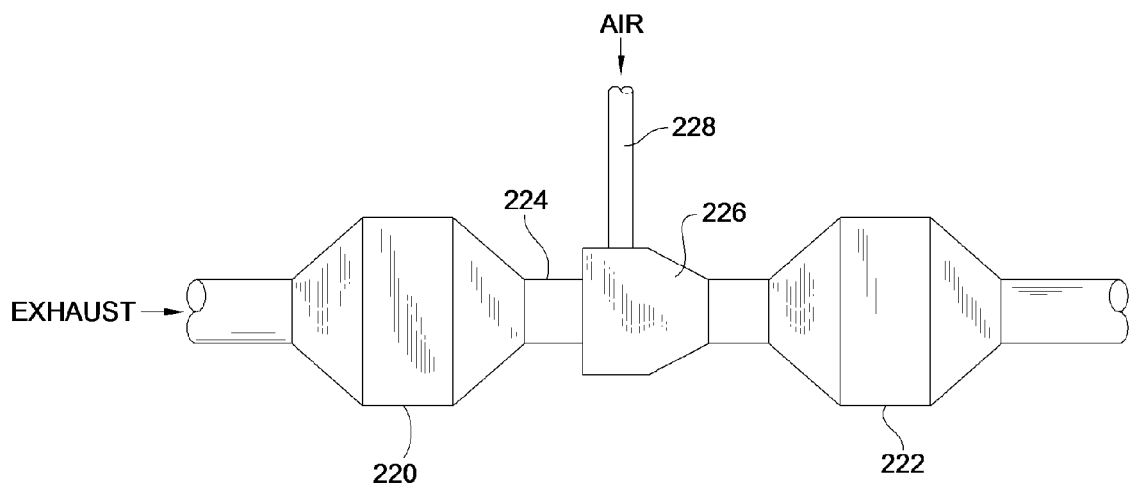

PASSIVE SECONDARY AIR DELIVERY SYSTEM FOR TWO BED CATALYST SYSTEM

FIELD OF THE INVENTION

This invention generally relates to a two bed catalyst system and more particularly to secondary air delivery systems for a two bed, three-way catalyst system for natural gas engines.

BACKGROUND OF THE INVENTION

For a natural gas engine having a three-way catalyst system for the engine exhaust, the air/fuel ratio must be held within a very narrow window to obtain simultaneous high efficiency of $NO_x$ reduction and CO oxidation in the catalyst. The disadvantage of this strategy is the difficulty of achieving the accuracy of air/fuel ratio control needed to obtain simultaneous high efficiency of both reactions, and maintaining this accuracy over the lifetime of the engine-catalyst system. A particular problem encountered is the tendency of the catalyst to age, resulting in further narrowing of the required control window, and also shifting its center.

In an attempt to overcome this control issue, some engine manufacturers have taken an alternate strategy to achieve high efficiency of $NO_x$ and CO oxidation in the catalyst. This alternate strategy divides the catalyst into two beds and operates the NOx reduction reaction in the first bed using a wider, less critical window of air to fuel ratio control. Secondary air is then added to the products exiting the first catalyst bed, prior to their entering the second catalyst bed. This secondary air supply ensures that there is sufficient oxygen present to effectively oxidize the remaining CO in the feedgas entering the second catalyst bed from the first catalyst bed.

Unfortunately, while such systems have been employed on certain passenger car engines under certain conditions, this type of system requires the inclusion of an engine driven air pump specifically fitted for the purpose and active controls to enable and disable and/or modulate the air delivery process. As should be apparent, such a system is disadvantageously expensive and complex owing to the addition of the air pump and active controls.

As such, there is a need in the art for a secondary air delivery system that can provide the needed oxygen to the second bed of a two bed catalyst to ensure effective oxidization of CO and unburned HC without unduly increasing the cost and complexity of the system. Embodiments of the present invention provide such a system and method.

BRIEF SUMMARY OF THE INVENTION

In view of the above, embodiments of the present invention provide a new and improved secondary air delivery system for a natural gas engine having a three-way exhaust catalyst. More particularly, embodiments of the present invention provide a new and improved secondary air delivery system to deliver air to the second bed of a two bed catalyst to ensure effective oxidization of CO and unburned HC. Still more particularly, embodiments of the present invention provide a new and improved passive secondary air delivery system that does not require the use of an additional air pump or controls associated therewith.

In one aspect, embodiments of the invention provide a passive secondary air delivery system for the second bed of a two bed catalyst for a turbo-charged natural gas engine. The system utilizes a passage to provide fresh, compressed air from the turbocharger to a secondary air introduction point on the two bed catalyst. The passage includes in one embodiment an orifice in series with a secondary air passage, which is sized to ensure sufficient air delivery over a whole engine speed/load range.

In other aspect, embodiments of the present invention provide a passive secondary air delivery system for the second bed of a two bed catalyst for naturally aspirated engines or for turbocharged engines that have fuel introduced upstream of the compressor. In such embodiments the catalyst is divided into separate chambers with an intermediate pipe containing a venturi mixer. The venturi mixer is ported to ambient air and sized to deliver the required amount of air to support the oxidation catalyst operation. In one embodiment, a post-catalyst oxygen sensor is used to assure that the air/fuel ratio is in the correct window to maintain excess oxygen for the oxidation process in the second catalyst bed.

The invention includes the use of passive means to deliver and meter air, rather than a purpose designed pump and active flow control. Additionally, the broad window of control makes low emissions with high longevity achievable without complex control hardware. In comparison to prior methods discussed above, embodiments of the present invention are advantageous because they are passive, have no moving parts, and do not require any active control.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2 is a diagram of an alternate embodiment of a passive secondary air system for a two bed catalyst constructed in accordance with the teachings of the present invention.

Figure 1:
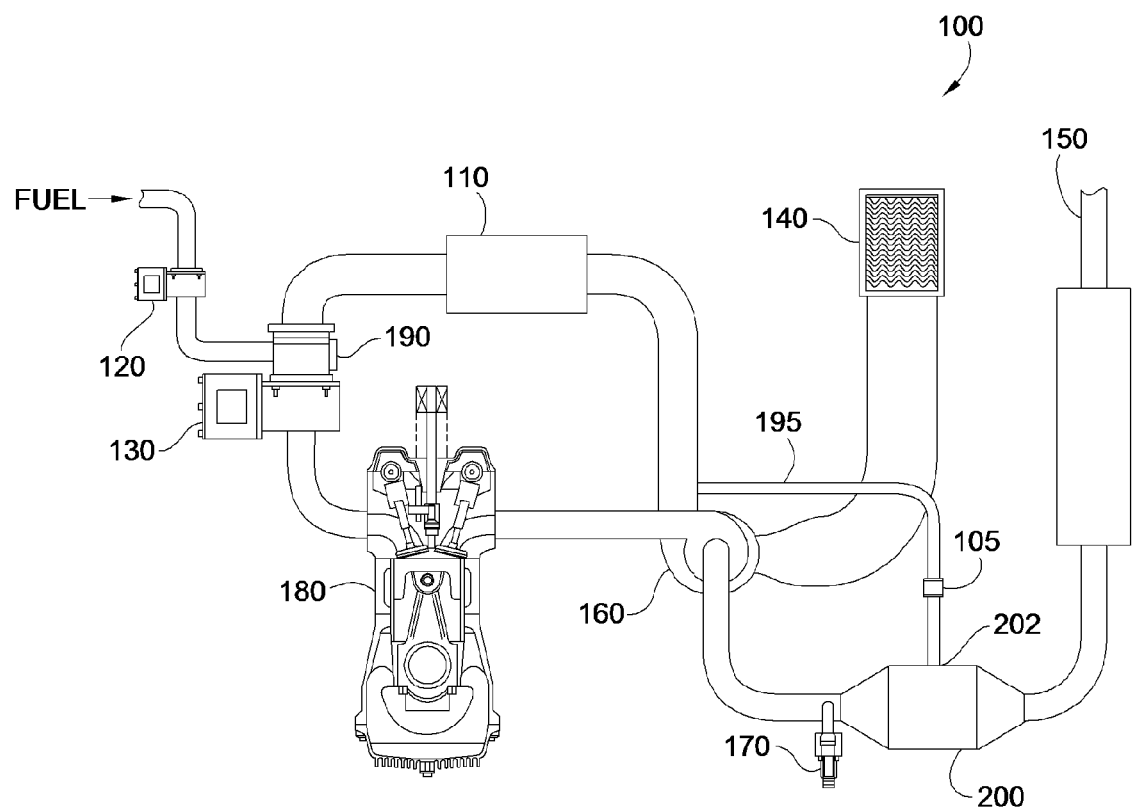
FIG. 1 is a diagram of a passive secondary air system for a two bed catalyst according to one embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of the present invention relate to a passive system and method of facilitating secondary air delivery to a two bed catalyst that is applicable to supercharged and non-supercharged engines which have fuel introduced to the charge air downstream of the supercharger (air compressor). In particular, embodiments of the present invention accomplish this without the addition of any moving parts or active controls to the engine system.

Referring to FIG. 1, a passive secondary air system 100 for the two bed catalyst 200 used in the exhaust 150 of a natural gas internal combustion engine 180 is shown. The engine 180 utilizes a turbocharger 160 for compressing air supplied from an air intake 140. The compressed charge air flows through a charge air cooler 110 where it is cooled before being mixed with the incoming fuel in mixer 190. The fuel supply system includes a fuel trim valve 120, and the amount of mixed air and fuel supplied to the engine 180 is controlled by the throttle 30. Exhaust from the engine 180 flows through the inlet of the turbocharger 160 to drive it to compress the air intake, past a heated exhaust gas oxygen (HEGO) sensor 170, and through the two bed catalyst 100 to an engine exhaust 150.

In one embodiment, the passive secondary air system 100 includes a passage 195 coupled to the outlet or charged air side of the turbocharger 160 to provide fresh, compressed air from the compressor to a secondary air introduction point 202 on the two bed catalyst 200. Tailoring of the air delivery rate to that needed for the oxidation reaction is accomplished via an orifice 105 in series with the secondary air passage 195. The orifice 105 is sized to ensure sufficient air delivery over the whole engine speed/load range. The nature of the oxidation reaction is such that oxygen in excess of that required to complete the reaction is in no way detrimental. As such, the sizing of the orifice 105 is not critical in that regard. Further, depending on the particular operating characteristics of the engine 180 and its exhaust system, it may be desirable to place a passive check valve (not shown) in-line with the passage 195 to ensure that exhaust can never flow from the catalyst 200 mid-bed to the compressor inlet or to the environment. However, this check valve is not required in embodiments that guarantee a positive pressure gradient toward the catalyst 200 under normal operating conditions.

The secondary air introduction point 202 is located in between the two catalyst beds. As such, the front catalyst bed is allowed to operate slightly rich of stoichiometry so as to allow the front catalyst to efficiently reduce $NO_x$ due to the rich feedgas. The rear catalyst bed, with the introduction of the passive secondary air, is operated slightly lean of stoichiometry so as to allow the rear catalyst to oxidize any remaining CO and unburned hydrocarbons (HC).

The purpose of the secondary air is to remove the need for extremely tight air/fuel ratio control by operating the air/fuel ratio control in a wide window that guarantees a slightly rich mixture to the first catalyst bed, and passively metering secondary air to guarantee a slightly lean mixture to the second catalyst bed. Because this invention is purposely designed to allow a wide air/fuel ratio control window and has only a single mode of operation (no regeneration), secondary air metering can be accomplished passively using a judiciously sized orifice 105 that meters suitable amounts of air for the engine's emissions critical operating range.

In an alternative embodiment of the present invention, especially applicable to non-supercharged engines or for turbocharged engines that have fuel introduced upstream of the compressor, the two catalyst beds are divided into two separate chambers 220, 222 with an immediate pipe 224 containing a venturi mixer 226. The venturi mixer 226 is ported in one embodiment to ambient air by pipe 228. The venturi mixer 226 and its air porting are sized to deliver the required amount of air to support the oxidation catalyst operation in chamber 222 as described above. As with the previous embodiment, the delivery of air to the second catalyst bed to enable the oxidation of CO and remaining unburned HC is completely passive.

The system of FIG. 2 may also include a post-catalyst HEGO sensor (not shown). The signal from this HEGO sensor is be used to assure that the air/fuel ratio is in the correct window to maintain excess oxygen for the oxidation process in the second catalyst bed in chamber 222.

As will now be apparent to those skilled in the art from the foregoing, in comparison to non-secondary air equipped systems, efficient three-way catalyst operation is achieved by the embodiments of the present invention with a relatively wider window of air/fuel ratio control, allowing the engine control system to be much simpler, with superior long-term durability of emissions. Additionally, in comparison prior secondary air equipped systems that utilize an air pump to supply the secondary air, secondary air delivery in embodiments of the present invention is accomplished without addition of any moving parts or active controls.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A passive secondary air delivery system for a turbocharged engine, comprising:
    a single exhaust gas treatment facility comprising a two bed catalyst having a first catalyst bed and a second catalyst bed positioned in an exhaust of the engine to reduce NOx and CO contained therein;
    a turbocharger comprising a compressor having an outlet;
    a passive secondary air introduction pipe having an inlet, the inlet positioned to receive passive secondary air from the outlet of the compressor, the passive secondary air introduction pipe having an outlet positioned at a location between the first catalyst bed and the second catalyst bed to introduce passive secondary air therebetween; and
    a fixed restriction for introducing the passive secondary air intermediate of the introduction pipe inlet and the introduction pipe outlet.

2. The passive secondary air delivery system of claim 1, wherein the two bed catalyst is housed in a single housing, and wherein the passive secondary air introduction pipe inlet is coupled downstream of the turbocharger compressor outlet and the passive secondary air pipe outlet is coupled to the single housing such that the passive secondary air pipe outlet fluidly communicates compressed air from the turbocharger between the first catalyst bed and the second catalyst bed.

3. The passive secondary air delivery system of claim 2, wherein the fixed restriction includes an orifice positioned in series with the passive secondary air introduction pipe, the orifice being sized to ensure sufficient air delivery over a whole engine speed/load range to assure oxidation of CO in the second catalyst bed.

4. The passive secondary air delivery system of claim 2, wherein no additional air pump is required to generate the passive secondary air.

5. The passive secondary air delivery system of claim 1, wherein the first catalyst bed is housed in a first housing positioned in the exhaust of the engine to reduce NOx, and wherein the second catalyst bed is housed in a second housing positioned in the exhaust of the engine downstream of the first housing to reduce CO contained in the exhaust,
wherein the fixed restriction is provided by a venturi mixer interposed between the first housing and the second housing; and
wherein the passive secondary air introduction pipe outlet is coupled to the venturi mixer to draw in passive secondary air for mixing therein with exhaust gases received from the first catalyst bed.

6. The passive secondary air delivery system of claim 5, wherein the porting of the venturi mixer is sized to ensure sufficient air delivery over a whole engine speed/load range to assure oxidation of CO in the second catalyst bed.

7. A passive secondary air delivery system for an engine exhaust system, comprising:
a single exhaust gas treatment facility comprising a two bed catalyst having a first catalyst bed and a second catalyst bed positioned in the exhaust of the engine to reduce NOx and CO contained therein;
a turbocharger comprising a compressor having an outlet;
a passive secondary air pipe having an inlet, the inlet positioned to receive passive secondary air from the outlet of the compressor, the passive secondary air pipe having an outlet positioned at a location between the first catalyst bed and the second catalyst bed to introduce passive secondary air therebetween, the passive secondary air not being generated via a dedicated air pump; and
a fixed restriction intermediate of the pipe inlet and the pipe outlet for introducing the passive secondary air.

8. The passive secondary air delivery system of claim 7, wherein the two bed catalyst is housed in a single housing, and wherein the passive secondary air pipe inlet is coupled downstream of the turbocharger and the passive secondary air pipe outlet is coupled to the single housing such that the passive secondary air outlet fluidly communicates compressed air from the turbocharger between the first catalyst bed and the second catalyst bed.

9. The passive secondary air delivery system of claim 8, wherein the fixed restriction includes an orifice positioned in series with the passive secondary air introduction pipe, the orifice being sized to ensure sufficient air delivery over a whole engine speed/load range to assure oxidation of CO in the second catalyst bed.

10. The passive secondary air delivery system of claim 7, wherein the first catalyst bed is housed in a first housing positioned in the exhaust of the engine to reduce NOx, wherein the second catalyst bed is housed in a second housing positioned in the exhaust of the engine downstream of the first housing to reduce CO contained in the exhaust, wherein the fixed restriction is provided by a venturi mixer that is interposed between the first housing and the second housing, and wherein the passive secondary air pipe outlet is coupled to the venturi mixer to draw in passive secondary air for mixing therein with exhaust gases received from the first catalyst bed.

11. The passive secondary air delivery system of claim 10, wherein the porting of the venturi mixer is sized to ensure sufficient air delivery over a whole engine speed/load range to assure oxidation of CO in the second catalyst bed.

12. A low emission engine system, comprising:
a single exhaust gas treatment facility comprising a two-bed catalyst in fluid communication with an exhaust port of the engine to receive combusted air/fuel mix, the two-bed catalyst having a passive secondary air inlet positioned between a first catalyst bed and a second catalyst bed to supply passive secondary air to the second catalyst bed to assist oxidation in the second catalyst bed of CO contained in the combusted air/fuel mix;
a turbocharger comprising a compressor having an outlet;
a passive secondary air introduction pipe having an inlet and an outlet, the inlet of the passive secondary air introduction pipe positioned to receive passive secondary air from the outlet of the compressor, the outlet of the passive secondary air introduction pipe coupled to the passive secondary air inlet of the two-bed catalyst; and
a fixed restriction intermediate of the inlet and the outlet of the passive secondary air introduction pipe for introducing the passive secondary air.

13. The engine system of claim 12, further comprising:
a single housing for the two-bed catalyst, the single housing accommodating the passive secondary air inlet therethrough.

14. The engine system of claim 13, wherein the fixed restriction includes an orifice interposed between the turbocharger and the secondary air inlet, the orifice being sized to ensure sufficient air delivery over a whole engine speed/load range to assure oxidation of CO in the second catalyst bed.

15. The engine system of claim 13, wherein no additional air pump is required to generate the passive secondary air.

16. The engine system of claim 12, further comprising:
a first housing configured to house the first catalyst bed of the two-bed catalyst, the first housing being positioned to reduce NOx in the combusted air/fuel mix;
a second housing configured to house the second catalyst bed of the two-bed catalyst, the second housing being positioned downstream of the first housing to reduce CO contained in the combusted air/fuel mix;
wherein the fixed restriction is provided by a venturi mixer interposed between the first housing and the second housing, the venturi mixer accommodating the passive secondary air inlet therethrough; and
wherein the passive secondary air introduction pipe is coupled to the passive secondary air inlet to allow the venturi mixer to draw in passive secondary air for mixing therein with exhaust gases received from the first catalyst bed.

* * * * *